Aug. 19, 1958     L. B. OPOCZYNSKI     2,847,778
CENTURY CALENDAR

Filed Aug. 27, 1956     3 Sheets-Sheet 1

INVENTOR:
Leib Ber Opoczynski
BY
AGENT

Aug. 19, 1958     L. B. OPOCZYNSKI     2,847,778
CENTURY CALENDAR

Filed Aug. 27, 1956     3 Sheets-Sheet 2

INVENTOR:
LEIB BER OPOCZYNSKI
BY *Karl F. Ross*
AGENT

Aug. 19, 1958     L. B. OPOCZYNSKI     2,847,778
CENTURY CALENDAR

Filed Aug. 27, 1956     3 Sheets-Sheet 3

*INVENTOR:*
LEIB BER OPOCZYNSKI

BY: *Karl F. Ross*
AGENT

United States Patent Office 2,847,778
Patented Aug. 19, 1958

2,847,778
CENTURY CALENDAR
Leib Ber Opoczynski, New York, N. Y.
Application August 27, 1956, Serial No. 606,292
8 Claims. (Cl. 40—109)

My present invention relates to a calendar and has for its principal object to provide a so-called century calendar, i. e., a calendar adjustable to indicate the day of the week for any given date in different centuries, covering the entire period of the Christian era (as well as any desired number of future centuries and/or part of the pre-Christian period) while using only two major elements movable relative to each other.

A more specific object of this invention is to provide a calendar of the character referred to having means for prominently displaying the days of the current century.

A further object is to provide a calendar showing at a glance the recurrence throughout the centuries of a particular constellation of week days.

In accordance with a feature of my invention, there are provided two relatively movable, indicia-bearing members of which one is provided with a plurality of cutouts, or windows, through which different indicia of the other member will be simultaneously exposed in each of a number of operative positions of the two members. More specifically, the apertured one of these members carries annual, mensual and hebdomadal markings and the other member has diurnal and century markings visible through the apertures of the former. A further, particular feature of this invention resides in the provision of a sliding mask for modifying the appearance of the exposed indicia according to whether common years or leap years are considered, thereby obviating the necessity for having two sets of schedules for the months of January and February.

The above and other objects and features of my invention will become more fully apparent from the following description of specific embodiments, reference being had to the accompanying drawing in which:

Fig. 2 represents a cross-section taken on the line 2—2 of Fig. 1;

Fig. 3 shows the lower, movable member of the calendar shown in Fig. 1;

Fig. 5 shows the movable member of the calendar shown in Fig. 4; and

Fig. 6 illustrates a masking element forming part of the calendar of Fig. 4.

Figure 1:
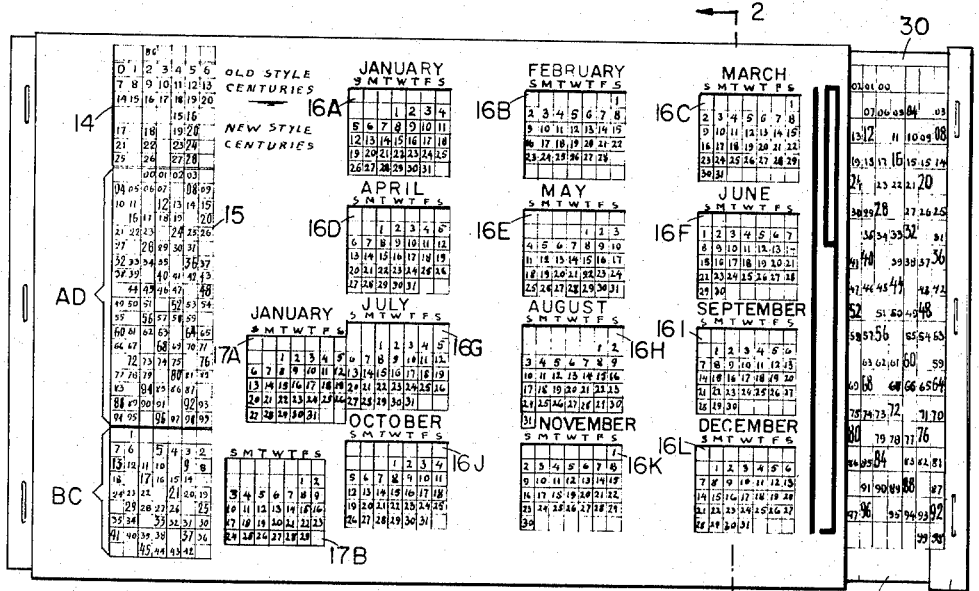
Fig. 1 shows a calendar according to the invention.

The device shown in Fig. 1 comprises a stationary sheet member 10 which is provided with a century cutout 14, divided in turn into an upper and a lower part labeled "old-style centuries" and "new-style centuries" respectively, a schedule or table 15 of annual indicia aligned with cutout 14, twelve mensual cutouts 16A through 16L, designated January through December, and two extra mensual cutouts 17A, 17B, also designated January and February. "January" cutout 17A and "July" cutout 16G have been shown combined into a single window. Furthermore, schedule 15 has been divided into two sections respectively designated "AD" and "BC." Adjacent each mensual cutout there are provided the usual hebdomadal designations S, M, T, W, T, F, S.

As shown in Fig. 2, the back of sheet 10 has attached to it a backing element 19. This backing element 19 forms a channel to receive a movable sheet member 30 having enlarged terminations 31 and 32, to facilitate the displacement of this member in the channel while preventing its accidental withdrawal therefrom, which carries an annual schedule 33 on its extreme right-hand end, another annual schedule 34 positioned to be viewed through cutout 14, and diurnal schedules 35, 36, 37 and 38 as best seen in Fig. 3. Schedule 35 is viewable through windows 16A, 16B and 16C; schedule 36 is aligned with windows 16D, 16E and 16F; schedule 37 can be seen through windows 17A, 16G, 16H and 16I; and schedule 38 appears through windows 17B, 16J, 16K and 16L.

If it is desired to find the day of the week for a particular date of the current (20th) century, the user simply displaces sheet 30 until the vertical column of annual schedule 33 bearing the last two digits of the desired year appears close to the right-hand edge of sheet 10 which has written next to it the two first digits ("19") of this century. Thus, the position illustrated in Fig. 1 applies to the years 1902, 1913, 1919, 1924, 1930 and so forth. A glance at window 16F, for example, reveals that in any of these particular years the first of June was a Sunday, the tenth of June a Tuesday, and so on. Bold print on schedule 33, as also on schedules 14, 15 and 34, indicates a leap year. Thus, a user interested in a day in January and February will consult window 16A or 16B if the year is, say, 1913 or 1941 but will refer to window 17A or 17B if a leap year, e. g. 1924, is involved. It should be remembered in this connection that the year 1900 is a common year under the Gregorian (new-style) calendar but a leap year under the Julian (old-style) calendar; schedule 33 applies only to the former.

For other centuries, the alignment between members 10 and 30 is carried out so that the century digits in cutout 14, forming part of schedule 34, are vertically aligned with the annual digits of the selected year as they appear in schedule 15. Thus, the position shown in Fig. 1 applies, for example, to the years 4, 10, 21, 105, 917, 1124 and 1488; also to the years 1600, 1606, 1763, 1824 etc. of the Julian calendar and to the years 1603, 1608, 1721, 1862 etc. of the Gregorian calendar. Bold print on schedule 15 indicates a leap year for any year other than those ending in 00; bold print on schedule 34 indicates that the year 00 of that particular century was a leap year, this being true of all the Julian centuries and of the years 1600, 2000, 2400 etc. of the Gregorian calendar. By the use of this method it is also possible to determine any date of the current century, under either of the two calendar systems; thus the illustrated position corresponds to Julian years 1903, 1908 etc. and to Gregorian years 1902, 1913 etc.

It will be understood that distinctive markings other than bold print, such as special coloring (e. g. red), may be used to designate leap years.

So far, we have been considering only that part of schedule 15 which has been marked "AD." If the user happens to be interested in a year of the pre-Christian era, he uses the marking "BC" on schedule 34 and aligns it with the digits in the "BC" portion of schedule 15 which designate that particular year. In the position shown, the calendar for the years 2, 8, 19, 25, 30 and 36 BC is directly displayed. In arranging the digits for this part of schedule 15 I have adhered to the prescriptions of the Encyclopedia Britannica. (It should be noted that the year 1 AD is immediately preceded by the year 1 BC.)

Figure 4:
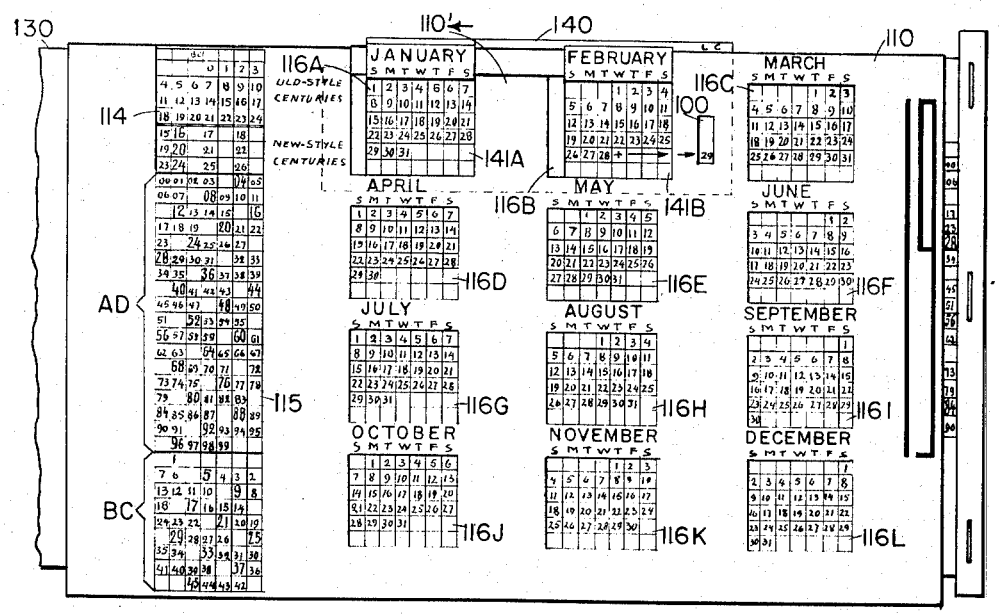
Fig. 4 illustrates a device generally similar to that of Fig. 1 but representing another embodiment of the invention.

In the embodiment of Figs. 4–6 I have shown a stationary sheet 110 co-operating with a movable sheet 130. Sheet 130 is generally similar to sheet 30 of the preceding embodiment and, as shown in Fig. 5, is provided with schedules 133, 134, 135, 136, 137 and 138 similar to the analogously designated schedules of Fig. 3. Sheet 110 is provided with cutouts 114, 116A through 116L, respectively corresponding to cutouts or windows 14 and 16A–16L of Fig. 1, and also carries a schedule 115 divided into an "AD" and a "BC" portion in analogy with schedule 15. Underscoring indicates the following day.

Instead of providing separate January and February windows as at 17A and 17B in Fig. 1, I attach to sheet 110 a slidable mask 140 (see also Fig. 6) interposed between sheets 110 and 130 and displaceable laterally by the width of one column of diurnal markings on schedule 135. The width of cutouts 116A and 116B exceeds by one column that of the remaining mensual cutouts 116C–116L, containing eight hebdomadal columns instead of seven. Mask 140 has two seven-column windows 141A and 141B which register with cutouts 116A and 116B, respectively, so as to cover either the extreme right-hand column or the extreme left-hand column of schedule 135 exposed by these cutouts. In the first of these positions the windows 141A and 141B are aligned with cutouts 116D, 116G, 116J and 116E, 116H, 116K, respectively, and the letter C appears in an aperture 100 of sheet 110 to indicate a common year. In the second position, shown in Fig. 4, the letter L appears at aperture 100 to indicate a leap year; underneath this letter there also appears the marking "29" to indicate, with the aid of an arrow in "February" window 116B, 141B, that this month is to be counted with twenty-nine days. It should be noted that the hebdomadal markings for January and February are carried on the mask 140 and not on the sheet 110.

The bridge portion 110' of sheet 110, separating the cutouts 116A and 116B, may be omitted since it registers with a similar bridge portion 140' of mask 140.

My invention is, of course, not limited to the specific embodiments described and illustrated but may be realized in numerous modification and adaptations without departing from the spirit and scope of the appended claims.

I claim:

1. A calendar comprising a pair of relatively movable members; one of said members being provided with a century cutout, a schedule of annual digits aligned with said century cutout, twelve mensual cutouts, and hebdomadal markings adjacent said mensual cutouts; the other of said members being provided with diurnal markings visible through said mensual cutouts and with century markings visible through said century cutout, alignment of any annual marking with a particular century marking resulting in the alignment of the proper hebdomadal markings with the diurnal markings in said mensual cutouts for the year designated by the aligned century and annual markings.

2. A calendar according to claim 1, wherein said one member is provided with two extra mensual cutouts for the months of January and February of leap years.

3. A calendar according to claim 2, wherein said leap years are distinctively designated on said annual markings.

4. A calendar according to claim 1, wherein said century markings are subdivided into old-style and new-style centuries.

5. A calendar according to claim 1, wherein said century markings and said annual markings include designations of years of the pre-Christian era.

6. A calendar according to claim 1, wherein said other member is provided with a separate schedule of annual markings for the current century selectively positionable adjacent an edge of said one member.

7. A calendar according to claim 1, wherein said hebdomadal markings divide each of said mensual cutouts into seven columns and wherein two of said mensual cutouts, corresponding to the months of January and February, are of greater width so as to accommodate each an additional column, further comprising masking means interposed between said member and displaceable by the width of one column in a manner exposing in each of two extreme positions only seven columns of masking means carrying hebdomadal markings for said two mensual cutouts.

8. A calendar according to claim 7, wherein said one member is provided with an aperture and said masking means is provided with common-year and leap-year designations respectively visible through said aperture in said two extreme positions thereof.

References Cited in the file of this patent

UNITED STATES PATENTS

| | | |
|---|---|---|
| 529,979 | Vawter | Nov. 27, 1894 |
| 641,433 | Buell | Jan. 16, 1900 |
| 776,297 | Cordeiro | Nov. 29, 1904 |
| 786,618 | Ball et al. | Apr. 4, 1905 |
| 1,223,128 | Wallace | Apr. 17, 1917 |
| 1,266,610 | Moerk | May 21, 1918 |

FOREIGN PATENTS

| | | |
|---|---|---|
| 244,263 | Great Britain | Dec. 17, 1925 |